United States Patent
Gao

(10) Patent No.: US 9,368,135 B2
(45) Date of Patent: Jun. 14, 2016

(54) DATA STORAGE DEVICE WITH PHASE LOCK SPIN-TORQUE OSCILLATION STABILIZATION

(71) Applicant: Seagate Technology LLC, Cupertino, CA (US)

(72) Inventor: Kaizhong Gao, North Oaks, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 14/810,138

(22) Filed: Jul. 27, 2015

(65) Prior Publication Data

US 2016/0027456 A1 Jan. 28, 2016

Related U.S. Application Data

(60) Provisional application No. 62/029,274, filed on Jul. 25, 2014.

(51) Int. Cl.
| | | |
|---|---|---|
| *G11B 5/127* | (2006.01) | |
| *G11B 5/35* | (2006.01) | |
| *G11B 5/60* | (2006.01) | |
| *G11B 5/11* | (2006.01) | |
| *G11B 5/00* | (2006.01) | |

(52) U.S. Cl.
CPC .. *G11B 5/35* (2013.01); *G11B 5/11* (2013.01); *G11B 5/127* (2013.01); *G11B 5/6082* (2013.01); *G11B 2005/0024* (2013.01)

(58) Field of Classification Search
CPC ........... G11B 5/127; G11B 5/147; G11B 5/33
USPC .................. 360/125.1–125.9, 125.31–125.35
See application file for complete search history.

(56) References Cited

U.S. PATENT DOCUMENTS

| | | |
|---|---|---|
| 7,616,412 B2 | 11/2009 | Zhu et al. |
| 7,982,996 B2 | 7/2011 | Smith et al. |
| 8,049,567 B2 | 11/2011 | Persson et al. |
| 8,259,409 B2 | 9/2012 | Braganca et al. |
| 8,305,711 B2 | 11/2012 | Li |
| 8,345,380 B2 | 1/2013 | Sato et al. |
| 8,363,355 B2 | 1/2013 | Mochizuki et al. |
| 8,755,150 B2 | 6/2014 | Chen et al. |
| 8,804,284 B1 | 8/2014 | Ohtake et al. |
| 9,030,783 B1 | 5/2015 | Braganca et al. |
| 9,047,894 B2 | 6/2015 | Chiu et al. |
| 9,064,508 B1* | 6/2015 | Shiimoto ............... G11B 5/187 |
| 9,076,463 B2 | 7/2015 | Yamada |
| 2011/0216447 A1 | 9/2011 | Li |
| 2013/0027803 A1* | 1/2013 | Tanabe ................. G11B 5/1278 360/55 |
| 2015/0043106 A1* | 2/2015 | Yamada ............... G11B 5/1278 360/123.05 |
| 2015/0098150 A1 | 4/2015 | Chiu |

* cited by examiner

*Primary Examiner* — Allen T Cao
(74) *Attorney, Agent, or Firm* — Hall Estill Attorneys at Law

(57) ABSTRACT

A data storage device can be configured at least with a first spin-torque oscillator disposed between and contacting a write pole and a shield on an air bearing surface. A second spin-torque oscillator can be disposed between and contact the write pole and shield with the second spin-torque oscillator separated from the air bearing surface by a first stabilization distance and from the first spin-torque oscillator by a second stabilization distance. The first and second spin-torque oscillators can be configured to magnetostatically couple and phase lock to produce a single microwave frequency in response to a bias field.

20 Claims, 4 Drawing Sheets

US 9,368,135 B2

DATA STORAGE DEVICE WITH PHASE LOCK SPIN-TORQUE OSCILLATION STABILIZATION

RELATED APPLICATION

The present application makes a claim of domestic priority to U.S. Provisional Patent Application No. 62/029,274 filed Jul. 25, 2014, the contents of which are hereby incorporated by reference.

SUMMARY

A data storage device, in accordance with assorted embodiments, has a first spin-torque oscillator disposed between and contacting a write pole and a shield on an air bearing surface. A second spin-torque oscillator is disposed between and contacts the write pole and shield with the second spin-torque oscillator separated from the air bearing surface by a first stabilization distance and from the first spin-torque oscillator by a second stabilization distance. The first and second spin-torque oscillators are respectively configured to magnetostatically couple and phase lock to produce a single microwave frequency in response to a bias field.

DETAILED DESCRIPTION

Microwave assisted magnetic recording (MAMR) may increase data capacity of a data storage device. Implementation of MAMR can utilize nonlinear resonant interactions between data media and high frequency magnetic fields to optimize the scale and speed of data bit programming. However, the generation of high frequency magnetic fields can be unstable and may degrade data bit writing performance, particularly in reduced form factor data storage environments.

The lack of stable MAMR data writers has rendered a data storage device with first and second spin-torque oscillators (STO) positioned between a write pole and a shield with the first STO located on an air bearing surface (ABS) and the second STO separated from both the ABS and first STO. The multiple spin-torque oscillators positioned between the write pole and shield can utilize a phase lock mechanism to stabilize the generation of high frequency magnetic fields. That is, magnetostatic coupling between the spin-torque oscillators can generate a stable single frequency by tuning the construction of the spin-torque oscillators and the position of the oscillators in relation to the ABS and each other.

Figure 1:
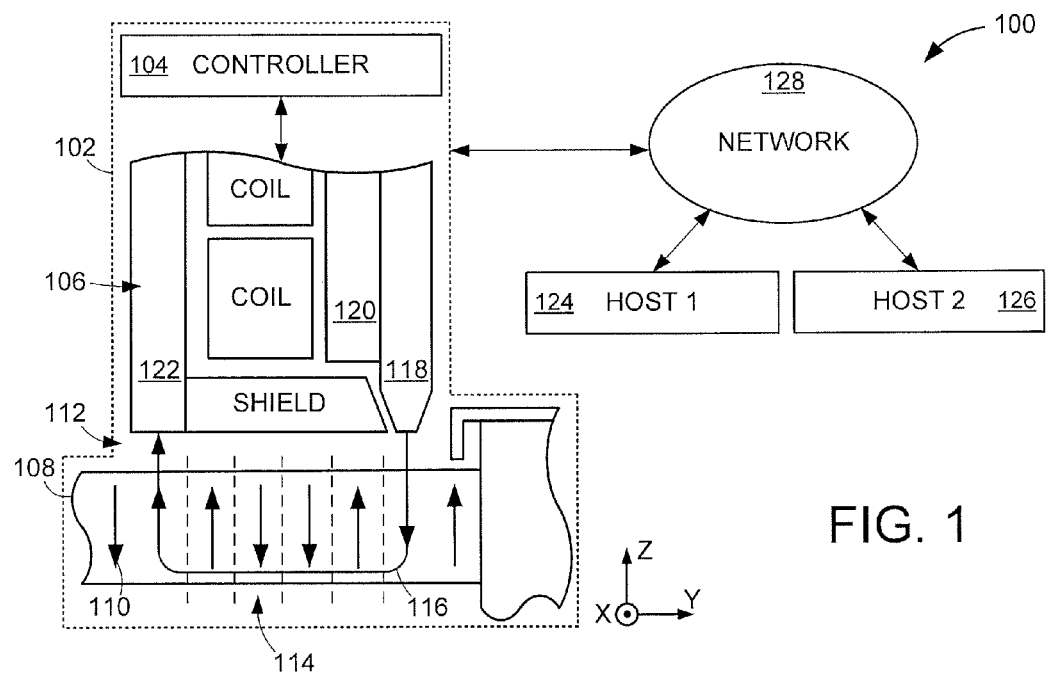
FIG. 1 is a block representation of an example data storage system constructed and operated in accordance with various embodiments.

A data writer is not limited to a particular environment or device. However, a data writer can be incorporated into the example data storage system 100 of FIG. 1 that is configured in accordance with various embodiments. The data storage system 100 may consist of one or more data storage devices 102 each configured with at least one transducing assembly 104 that is controlled by one or more local controllers 106 that temporarily and permanently stores data to and retrieves data from the transducing assembly 104 and a local memory 108, which can be an unlimited variety of memories, such as a volatile, non-volatile, and solid-state memory.

As shown, the transducing portion 104 has a transducing head 110 suspended over a magnetic storage medium 112 that is capable of storing programmed bits 114 in a predetermined orientation, such as perpendicular or longitudinal to an air bearing surface (ABS) 116. The storage medium 112 is attached to and controlled by a spindle motor 118 that rotates to produce the ABS 116 on which the transducing head 110 flies to access selected data bits 114 from the medium 112. The transducing head 110 can include one or more transducing elements, such as a magnetic writer and magnetically responsive reader, which operate to program and read data from the storage medium 112, respectively. The writing element portion of the transducing head shown in FIG. 1 can generate magnetic flux from a coil and emit predetermined amounts of the magnetic flux from a write pole 120 to a return pole 122 through the storage medium 112 in a circuit 124 to impart a predetermined polarity that programs at least one data bit 114.

The data storage device 102 may be operated locally and remotely via connection to any number of wired and wireless connections via at least one network 128. While not limited to any particular type or number of remote connections, one or more hosts 130, nodes 132, and servers 134 can concurrently and autonomously access the data storage device 102. For example, the network 128 may enable the data storage device 102 to be part of a cloud computing system or a redundant array of independent discs (RAID) via appropriate protocol. The unlimited variety of local and remote computing configurations allows the data storage system 100 to be adapted and optimized for a diverse array of applications.

Figure 2A:
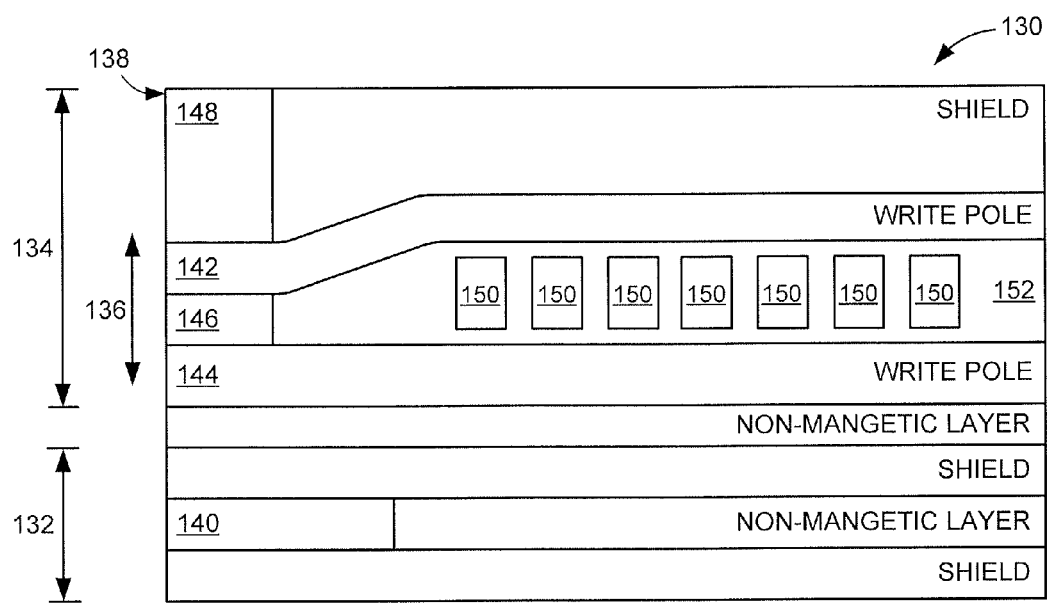
FIGS. 2A and 2B respectively are block representations of portions of an example data storage device configured in accordance with some embodiments.
Figure 2B:
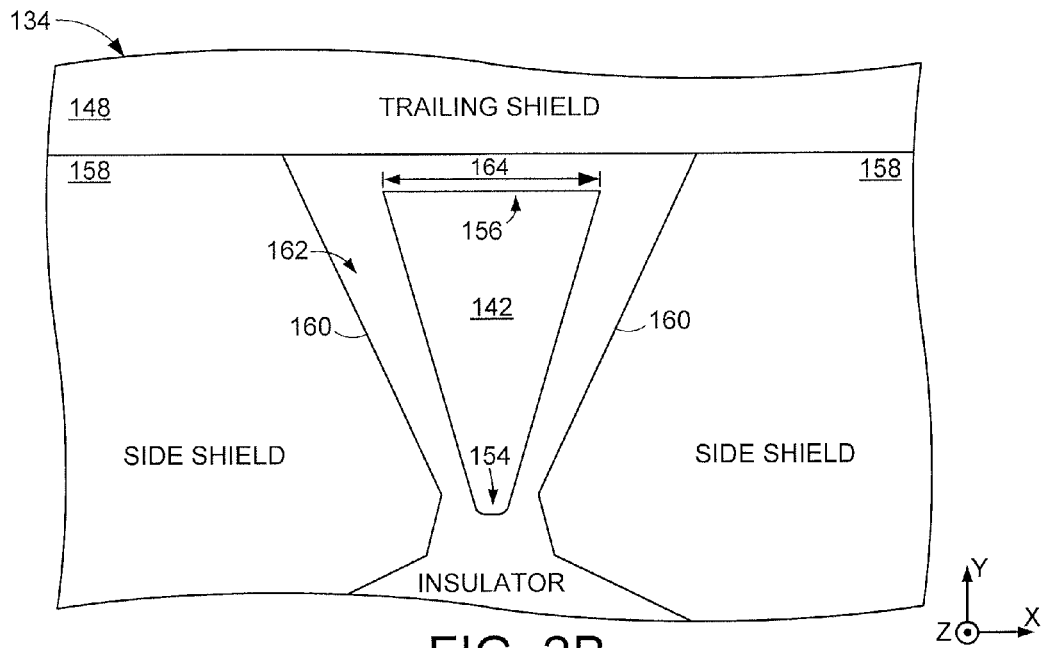

FIG. 2 displays a block representation of a portion of an example data writer 140 constructed and operated in accordance with some embodiments. The data writer 140 has a main write pole 142 that is disposed between leading 144 and trailing 146 return poles, as dictated by the direction of travel of the adjacent data storage medium 148. Magnetic flux may be directed, at least partially, from a write coil 150 to the write pole by a yoke 152 that is recessed from the ABS by a predetermined distance 154. The main write pole 142 has write pole tip 156 shaped with a rectangular sidewall 158 aligned along the X axis and a tapered sidewall 160 positioned at a common angle $\theta_1$ from the X axis. The common angle $\theta_1$ can be tuned to funnel magnetic flux to a trailing portion 162 of the write pole tip 156 on the ABS. The trailing portion 162 may be configured, in some embodiments, to match the width 164 of a data bit 166 between data tracks 168.

As the areal density of the data bits 162 increases to provide greater data capacity, the data bit width 164 associated with a data track 168 decreases. Such reduced data track spacing emphasizes the accuracy magnetic flux delivery from the write pole 142 as well as shielding from leading 170 and trailing 172 shields on the ABS. That is, the leading 170 and trailing 172 shields can be tuned for material, size, and position on the ABS to absorb external magnetic fields and define a magnetic extent of the write pole 142 on the data storage medium 148 that allows individual data bits 162 to be programmed. However, nanometer scale physical dimensions for the various data writer 140 components can restrict magnetic flux delivery to the data storage medium 148. For instance, bringing one or both shields 170 and 172 in closer proximity to the write pole tip 156 can reduce the magnetic extent of the write pole 142, but can be prone to unwanted magnetic shunting that decreases writer performance.

The minimization of physical dimensions of the various data writer 140 components can further result in magnetic erasure as magnetic flux saturates and travels from the coil 150 to the yoke 152, write pole 142, and shield 170 before reaching the data storage medium 148. Therefore, despite the tapered configuration of the write pole tip 156, position of the shields 170 and 172 on the ABS, and recess of the yoke 152 from the ABS, the smaller physical dimensions of the data writer 140 can lead to degraded performance. Accordingly, the position of a high frequency generator, such as a spin-torque oscillator, proximal the write pole 142 can alter the coercivity of an adjacent data bit and allow lower write fields to be used to program data.

Figure 3:
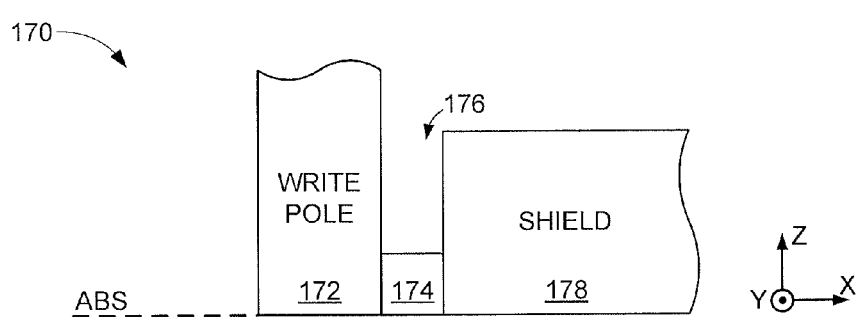
FIG. 3 shows a top view block representation of an example data writer configured in accordance various embodiments.

FIG. 3 is a block representation of a portion of an example data storage device 170 configured in accordance with various embodiments. A write pole 172 is physically connected to the ABS and a high frequency generator 174, which acts in concert with the write pole 172 to program data bits via microwave assisted magnetic recording. The high frequency generator 174 is positioned in a write gap 176 and concurrently contacts the write pole 172 and a magnetic shield 178. It is contemplated that magnetic flux can pass from the write pole 172, through the high frequency generator 174 and to the shield 178 to apply a bias field to the high frequency generator.

Figure 4:
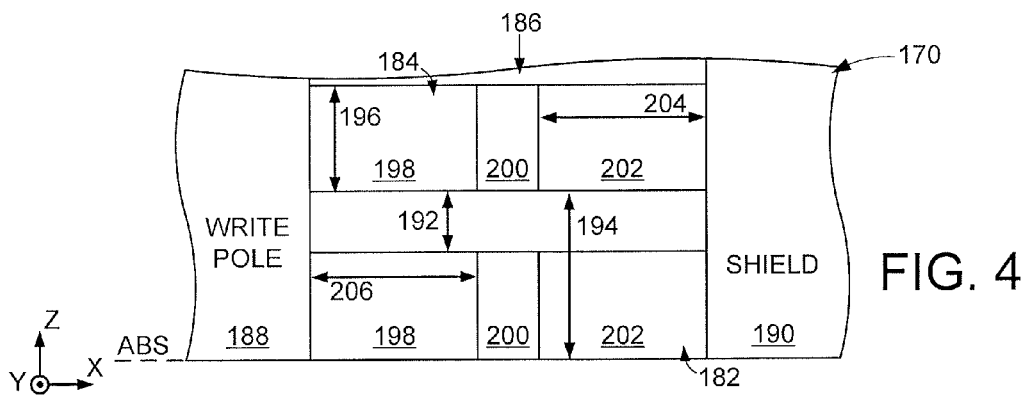
FIG. 4 depicts a top view block representation of a portion of an example data writer configured in accordance with some embodiments.

FIG. 4 is a block representation of a portion of an example data writer 180 constructed and operated in accordance with some embodiments as a MAMR data storage device. The data writer 180 is configured with first 182 and second 184 spin-torque oscillators (STO) each positioned in a write gap 186 and contacting both a write pole 188 and magnetic shield 190. The position of the second STO 184 can be tuned to be physically separated from the first STO 182 by a first distance 192 and from the ABS by a greater second distance 194. The separation of the two STOs 182 and 184 can be further tuned to provide a predetermined magnetostatic coupling that corresponds with a phase lock mechanism in the presence of a bias field that stabilizes the oscillation of each STO 182 and 184, which can optimize the generation of a single microwave frequency during data bit programming.

In some embodiments, each STO 182 and 184 is configured similarly, as shown in FIG. 4; however, other embodiments configure the STOs 182 and 184 to have different materials, layers, and thicknesses 196 to provide tuned magnetostatic coupling and a phase lock mechanism between the STOs 182 and 184. Each STO 182 and 184 in data writer 180 is configured as a trilayer stack with a spin injection layer 198, interlayer 200, and field generating layer 202. It is contemplated that the respective STOs 182 and 184 can be oriented differently in the write gap 186 so that the field generating layer is aligned with portions of the spin injection layer 198 along the Z axis. The constituent layers of the STOs 182 and 184 may also be tuned for width along the X axis. For example, the width 204 of the field generating layer 202 can be the same, or different, than the width 206 of the spin injecting layer 198.

Figure 5A:
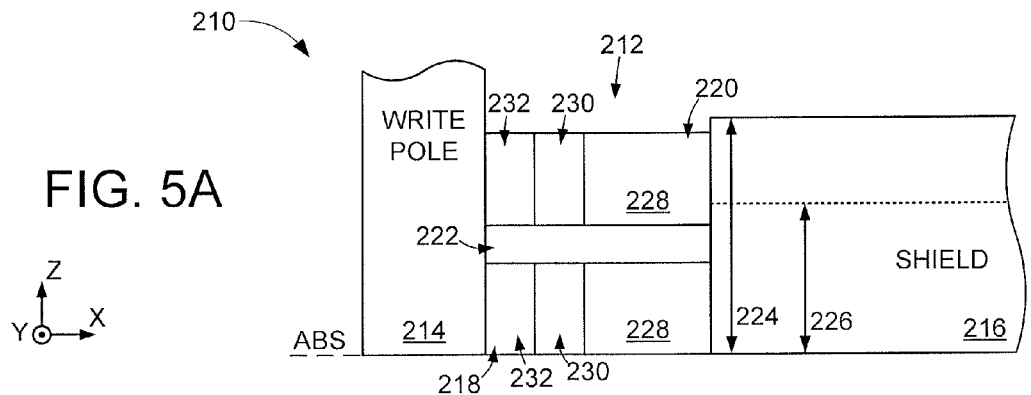
FIGS. 5A and 5B respectively show assorted views of a portion of an example data writer configured in accordance with various embodiments.
Figure 5B:
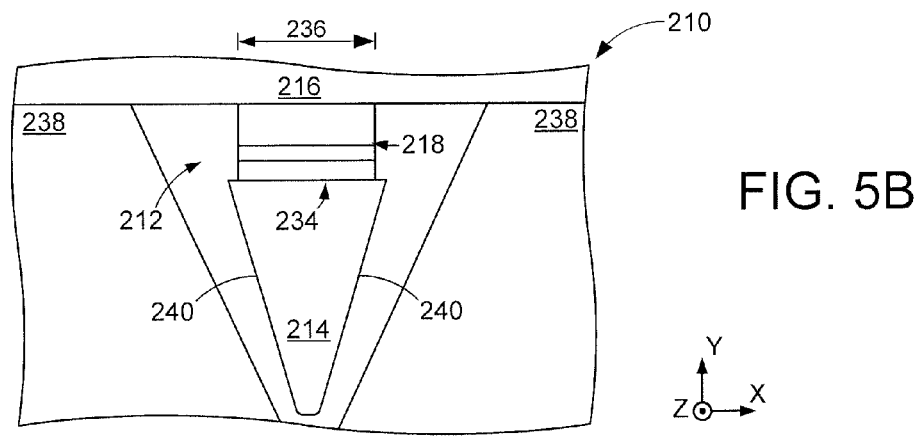

FIGS. 5A and 5B respectively display top and ABS view block representations of portions of an example data writer 210 configured in accordance with various embodiments. A write gap 212 between a write pole 214 and magnetic shield 216 is partially filled with first 218 and second 220 STOs that are physically separated by an oscillation gap 222. The magnetic shield 216 may have a height, along the Z axis, that is tuned to be greater than, or smaller than, the height of the combined oscillation gap 222 and STOs 218 and 220. That is, the shield 216 can be tuned to have a first height 224 that extends beyond the height of the second STO 220 or a second height 226 that does not extend past the distance from the distal edge of the second STO 220 to the ABS.

The non-limiting embodiment of FIG. 5A shows how the STOs 218 and 220 can have a wider field generating layer 228 than the interlayer 230 or spin injecting layer 232. In some embodiments, the field generating layer 228 has a width that equals the aggregate width of the spin injecting layer 232 and interlayer 230. The size, shape, construction, and position of the STOs 218 and 220 can be tuned to induce a phase lock mechanism that corresponds with a single stable oscillation and microwave frequency being generated.

FIG. 5B is an ABS view of the data writer 210 that illustrates how the STOs 218 can be positioned between a trailing edge 234 of the write pole 214 and the shield 216. The STOs 218 and 220 can be tuned for length 236 along the X axis to reduce and eliminate the risk of inadvertent shunting with the side shields 238. The position of the STOs 218 and 220 on the trailing edge 234 of the write pole 214 is not limiting and one or more STOs can contact the sidewalls 240 of the write pole 214 in some embodiments.

Figure 6:
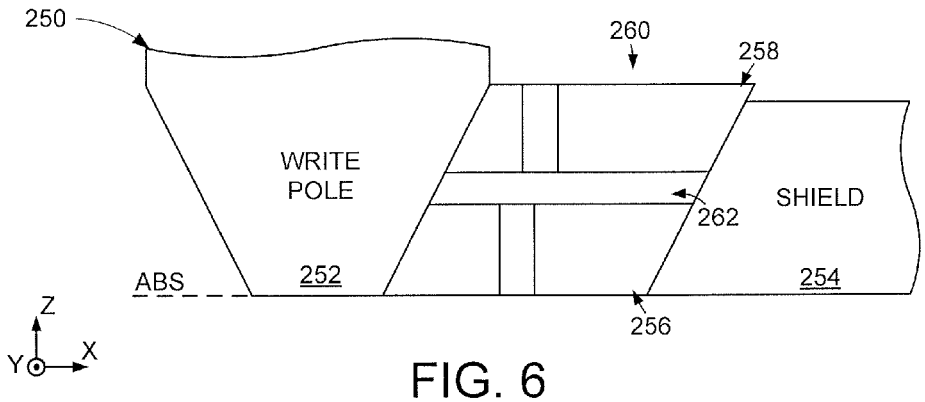
FIG. 6 provides a top view block representation of a portion of an example MAMR data writer constructed and operated in accordance with some embodiments.

FIG. 6 depicts a top view block representation of a portion of an example MAMR data writer 250 configured in accordance with some embodiments to have tapered write pole 252 and shield 254 sidewalls. First 256 and second 258 STOs can respectively be positioned in the write gap 260 between the write pole 252 and shield 254 to generate a predetermined microwave frequency, such as any frequency between 5-50 GHz. As shown, the taper angle of the write pole 252 sidewall can correspond with an offset alignment of the constituent layers of the respective STOs 256 and 258. The amount of offset and separating oscillation gap 262 distance can be tuned to provide a predetermined magnetostatic coupling between the STOs 256 and 258 that produces a single domain phase lock mechanism.

It is contemplated that bias magnetization, such as 5-15 kOe can pass from the write pole 252 through the STOs 256 and 258 in parallel to induce the phase lock mechanism and microwave frequency generation from the STOs 256 and 258. It is further contemplated that the STOs 256 and 258 can be tuned to oscillate at different frequencies that complement each other to produce a single microwave frequency experienced by an adjacent data storage medium. Through the tuning of multiple separate STOs in a data writer, a single domain high frequency can be produced with increased stabilization compared to using a single STO. The combination of STOs can provide a phase lock mechanism that promotes stable, single frequency, oscillation that optimizes MAMR data bit programming.

Figure 7:
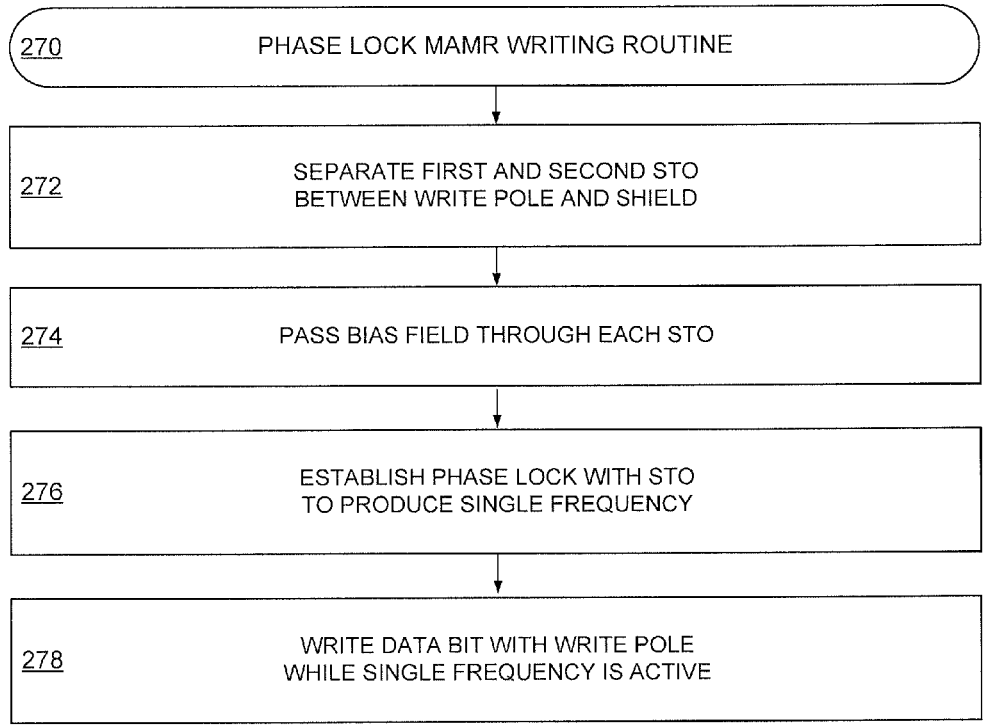
FIG. 7 is a flowchart of an example phase lock MAMR writing routine carried out in accordance with assorted embodiments.

FIG. 7 is a flowchart of an example phase lock MAMR writing routine 270 that can be executed to program one or more data bits on an adjacent data storage medium in accordance with various embodiments. The routine 270 can initially construct a data writer in step 272 with first and second STOs separating a write pole and shield. It is noted that the STOs can be similar, or dissimilar, materials, positions, and configurations while each contacting both the write pole and shield.

With the data writer constructed in step 272, step 274 can then pass a bias field through each STO to induce the respective STOs to oscillate. The bias field may pass through the STOs in parallel or series and generate similar, or dissimilar, oscillations that complement each other to establish a phase lock condition in step 276 where a single domain microwave frequency is produced. The ability to tune the respective STOs to have matching, or different, configurations and positions can efficiently utilize the bias field to produce a single, stable microwave frequency, which contradicts the use of a single STO that can be unstable.

The single microwave frequency can be tuned to change the coercivity of a portion of an adjacent data storage medium to allow step 278 to write one or more data bits with the write pole. That is, the phase locked STOs can allow MAMR data writing with the write pole. Without the phase locked condition of the STOs, MAMR operation would be inconsistent and inaccurate as data bits remain unaltered by the write pole as a result of unstable microwave frequency production.

Through the tuned position and configuration of multiple STOs in a data writer, microwave frequencies can be more reliably generated compared to a single STO. The ability to adjust the relative position of the STOs allows common or different responses to an applied bias field that complement each other to provide a phase locked condition and the generation of a single, stable microwave frequency.

It is to be understood that even though numerous characteristics and configurations of various embodiments of the present disclosure have been set forth in the foregoing description, together with details of the structure and function of various embodiments, this detailed description is illustrative only, and changes may be made in detail, especially in matters of structure and arrangements of parts within the principles of the technology to the full extent indicated by the broad general meaning of the terms in which the appended claims are expressed. For example, the particular elements may vary depending on the particular application without departing from the spirit and scope of the present disclosure.

What is claimed is:

1. A data writer apparatus comprising:
    a first spin-torque oscillator (STO) disposed between and contacting a write pole and a shield on an air bearing surface (ABS); and
    a second STO disposed between and contacting the write pole and shield, the second STO separated from the ABS by a first stabilization distance and from the first STO by a second stabilization distance, the first and second STOs configured to magnetostatically couple and phase lock to produce a single microwave frequency in response to a bias field.

2. The data writer apparatus of claim 1, wherein the first and second STOs each contact a trailing edge of the write pole and occupy less than all of a write gap between the write pole and shield.

3. The data writer apparatus of claim 1, wherein the single microwave frequency is 5-50 GHz.

4. The data writer apparatus of claim 1, wherein the bias field is 5-15 kOe and passes through the write pole, shield, and each STO.

5. The data writer apparatus of claim 1, wherein the shield has a height that is less than an aggregate height of the first STO, second STO, and first stabilization distance, each height measured perpendicular to the ABS.

6. The data writer apparatus of claim 1, wherein the shield has a height that is greater than an aggregate height of the first STO, second STO, and first stabilization distance, each height measured perpendicular to the ABS.

7. A sensor apparatus comprising:
    a first spin-torque oscillator (STO) disposed between and contacting a write pole and a shield on an air bearing surface (ABS); and
    a second STO disposed between and contacting the write pole and shield, the second STO separated from the ABS by a first stabilization distance and from the first STO by a second stabilization distance, each STO comprising an interlayer separating an injector layer from a generating layer, the first STO configured differently than the second STO to magnetostatically couple and phase lock the first and second STOs to produce a single microwave frequency in response to a bias field.

8. The sensor apparatus of claim 7, wherein the interlayer of the first STO is offset from the interlayer of the second STO, the offset measured parallel to the ABS.

9. The sensor apparatus of claim 7, wherein the respective generating layers of the STOs have different widths, each width measured parallel to the ABS.

10. The sensor apparatus of claim 7, wherein the write pole and shield each have tapered surfaces extending from the ABS at non-normal angles.

11. The sensor apparatus of claim 7, wherein the first STO oscillates at a different frequency than the second STO.

12. The sensor apparatus of claim 7, wherein a width of the injector layer of the first STO is different than a width of the generating layer of the first STO, each width measured parallel to the ABS.

13. The sensor apparatus of claim 7, wherein the first STO has a first length that is less than a second length of a trailing edge of the write pole, each length measured parallel to the ABS.

14. The sensor apparatus of claim 7, wherein the generating layer of the first STO has a width equal to an aggregate width of the interlayer and injector layer, each width measured parallel to the ABS.

15. The sensor apparatus of claim 7, wherein the generating layer of the first STO comprises a different material than the generating layer of the second STO.

16. A method for making a data writer comprising:
    positioning a first spin-torque oscillator (STO) between and contacting a write pole and a shield on an air bearing surface (ABS);
    disposing a second STO between and contacting the write pole and shield, the second STO separated from the ABS by a first stabilization distance and from the first STO by a second stabilization distance; and
    passing a bias field through each STO to magnetostatically couple and phase lock the first and second STOs to generate a single microwave frequency.

17. The method for making a data writer of claim 16, wherein the single microwave frequency alters a data bit on an adjacent data storage medium.

18. The method for making a data writer of claim 16, wherein the phase lock of the STOs produces a single stable oscillation and the single microwave frequency.

19. The method for making a data writer of claim 16, wherein the single microwave frequency is produced concurrently with programming of one or more data bits with the write pole.

20. The method for making a data writer of claim 16, wherein the bias field passes through the STOs in parallel.

* * * * *